(12) United States Patent
Markert et al.

(10) Patent No.: US 6,439,442 B1
(45) Date of Patent: Aug. 27, 2002

(54) LID WITH A SLIDABLE DISPENSING SPOUT

(75) Inventors: Brooks R. Markert, Harwinton, CT (US); Christopher J. Young, Port Washington, NY (US)

(73) Assignee: C&N Packaging, Inc., Wyandanch, NY (US)

( * ) Notice: Subject to any disclaimer, the term of this patent is extended or adjusted under 35 U.S.C. 154(b) by 0 days.

(21) Appl. No.: 09/851,878

(22) Filed: May 9, 2001

(51) Int. Cl.[7] ............................................. B65D 47/00
(52) U.S. Cl. ....................... 222/547; 222/559; 222/561; 222/531; 215/322; 220/345.1
(58) Field of Search ................................ 222/547, 559, 222/561, 531, 532, 537; 215/322; 220/345.1, 345.2, 345.4, 254

(56) References Cited

U.S. PATENT DOCUMENTS

| | | | |
|---|---|---|---|
| 1,274,969 A | | 8/1918 | Wirt |
| 2,102,118 A | * | 12/1937 | Heatlie .......................... 221/62 |
| 2,111,482 A | * | 3/1938 | Ruetz ........................... 221/60 |
| 2,123,643 A | * | 7/1938 | Wilson ......................... 221/62 |
| 2,139,085 A | * | 12/1938 | Lawson ......................... 221/60 |
| 2,492,846 A | * | 12/1949 | Coyle et al. ................. 222/559 |
| 2,511,560 A | | 6/1950 | Bechmann |
| 2,665,038 A | * | 1/1954 | Fowler ......................... 222/561 |
| 2,808,186 A | * | 10/1957 | Kates .......................... 222/561 |
| 3,174,661 A | * | 3/1965 | Speicher ...................... 222/545 |
| 3,223,297 A | * | 12/1965 | Nyden ......................... 222/485 |
| 3,659,758 A | * | 5/1972 | Waterman .................... 222/561 |
| 4,057,167 A | * | 11/1977 | Lee ............................. 220/90.4 |
| 4,773,568 A | | 9/1988 | Schaefer |
| 4,925,067 A | * | 5/1990 | Zemlo et al. ................ 222/480 |
| 4,998,674 A | | 3/1991 | Torra |
| 5,054,634 A | * | 10/1991 | Margotteau .................. 215/322 |
| 5,086,941 A | * | 2/1992 | English et al. .............. 220/254 |
| 5,193,722 A | * | 3/1993 | Groya et al. ................. 221/531 |
| 5,390,828 A | * | 2/1995 | Gross .......................... 222/211 |
| 5,697,533 A | * | 12/1997 | Shahbazian ................. 222/480 |
| 5,938,062 A | | 8/1999 | Paramski |

FOREIGN PATENT DOCUMENTS

GB      2112761 A  *  7/1983  ........... B65D/47/26

* cited by examiner

*Primary Examiner*—Lesley D. Morris
*Assistant Examiner*—F. Nicolas
(74) *Attorney, Agent, or Firm*—Gerald T. Bodner, Esq.

(57) ABSTRACT

A lid to dispense granular material. The lid includes a hole through which the granular material may flow and is closable by a combination seal and dispenser slidably mounted thereto. The dispenser has exit passages when extended located outwardly of the lid rim. A guide wall mounted to the lid main body extends into the seal and dispenser passage.

13 Claims, 5 Drawing Sheets

LID WITH A SLIDABLE DISPENSING SPOUT

BACKGROUND OF THE INVENTION

The present invention relates generally to the field of containers and lids for dispensing fluidized material.

DESCRIPTION OF THE PRIOR ART

A variety of containers and lids have been devised for spreading fluidized material, such as, grass seed, fertilizer, food products and various granular and powdered material. For example, U.S. Pat. No. 1,274,969 discloses a broadcast sower for distributing seed from a container in a plurality of different directions. U.S. Pat. No. 2,511,560 discloses a scoop for manually scattering powdered or granular materials, such as, lime, fertilizer, or seeds with the scoop provided with a plurality of vanes to direct the material outwardly from the scoop. Another seed spreader that inertially ejects the seed from the hopper is disclosed in U.S. Pat. No. 4,773,568. A more simple approach is disclosed in U.S. Pat. No. 4,998,674 that includes a telescopic nozzle to uniformly distribute granular material. U.S. Pat. No. 5,938,062 discloses a container lid having an aperture closable by a slidable wall mounted to the lid of the container.

Despite the prior spreaders and distributors, there is still a need for a sturdy container lid that is easy to operate for distributing granular material simultaneously in a variety of different radial directions. It is desirable such a lid be resealable to allow for repeated distributions.

SUMMARY OF THE INVENTION

One embodiment of the present invention is a lid to dispense material from the mouth of a container comprising a main body mountable on the mouth of a container. The main body includes an opening for receiving material moving through the mouth of the container and a combination seal. A dispenser is movably mounted to the main body and has a sealing position whereat the seal and dispenser blocks material flow through the opening and a dispensing position whereat material is allowed to flow through the mouth and opening. The seal and dispenser includes a plurality of vane surfaces to direct material flowing through the opening outwardly from the lid.

It is an object of the present invention to provide a new and improved lid for dispensing fluidized material from a container.

A further object of the present invention is to provide a resealable lid for radially distributing granular material in a variety of directions.

An additional object of the present invention is to provide a material dispensing closure wherein granular material is dispensed outwardly of the edge portion or "rim" of the closure.

Related objects and advantages of the present invention will be apparent from the following description.

DESCRIPTION OF THE PREFERRED EMBODIMENT

Figure 1:
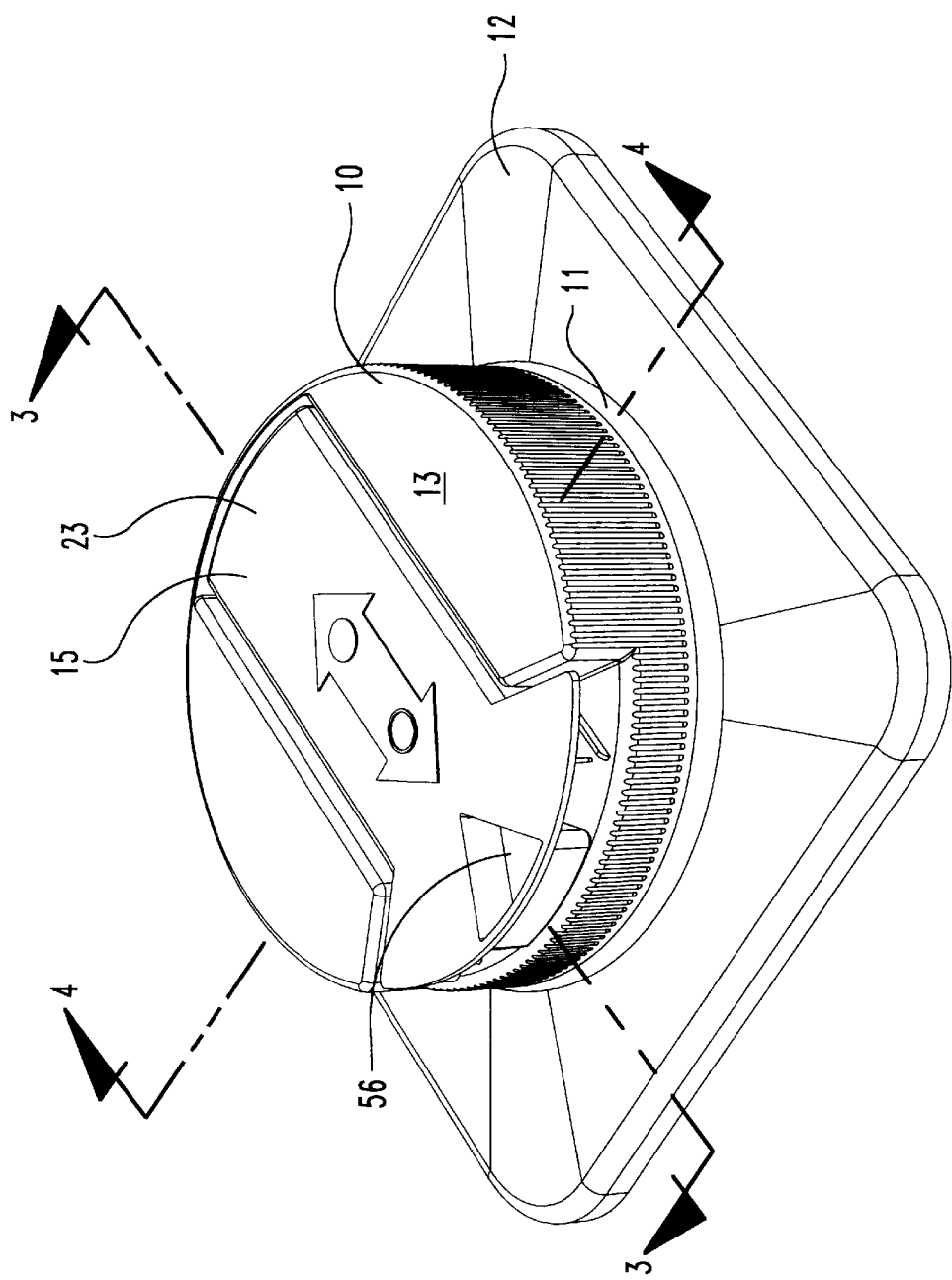
FIG. 1 is a top perspective view of a lid incorporating the present invention mounted to the top of the container with the lid being in the closed or sealing position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a lid 10 for dispensing material from the mouth 11 of a container 12. Only the top portion of the container 12 is depicted in the drawings it being understood that the main body of the container extends downwardly from the top portion as shown in FIG. 1. The container may be filled with a fluidized material, such as, a granular or powdered material. For example, the container may hold grass seed or fertilizer. Lid 10 includes a main body 13 removably mountable on mouth 11 by means of threads or similar structure. Mouth 11 may be provided with circumferentially extending and outwardly facing threads in meshing engagement with the circumferentially extending and inwardly facing threads 14 (FIG. 4) provided on main body 13. A combination seal and dispenser 15 is slidably mounted to the lid main body 13 and has a retracted or sealing position depicted in FIG. 1 and an extended or dispensing position depicted in FIG. 2.

The lid main body 13 has a circumferentially extending edge portion or "rim" 16 (FIG. 4) integrally joined to a top wall 17. A pair of spaced apart walls 18 and 19 are integrally joined to and extend downwardly from top wall 17 forming an upwardly opening channel 20. Walls 18 and 19 have bottom ends integrally joined to a horizontal wall 21 extending across the bottom of channel 20. A hole 22 is formed in bottom wall 21 and is aligned with the mouth 11 of container 12. Thus, the material within the container may flow through mouth 11 and then through hole 22 of lid main body 13.

Figure 4:
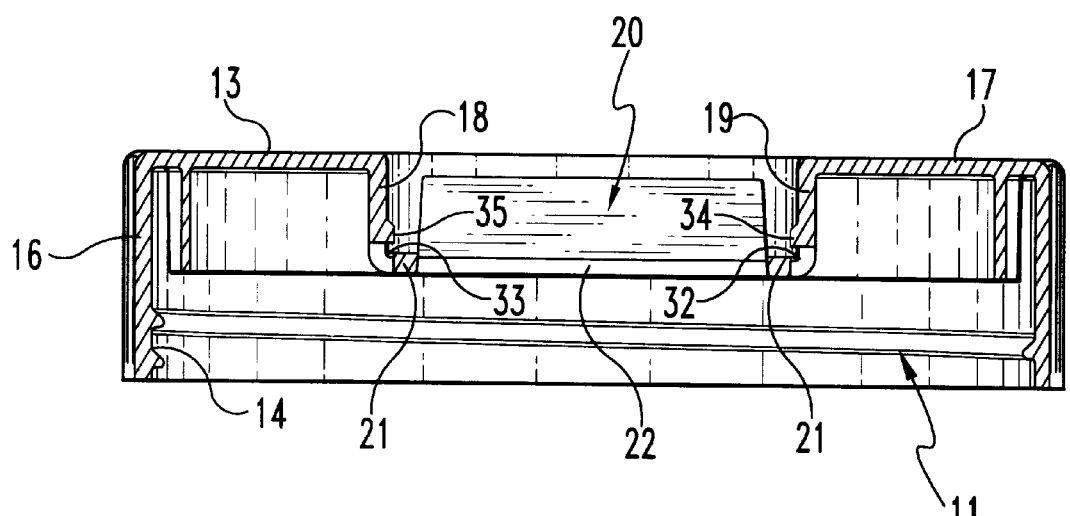
FIG. 4 is a cross-sectional view taken along the line 4—4 of FIG. 1 and viewed in the direction of the arrows illustrating the lid main body without the slide dispenser mounted thereto.
Figure 5:
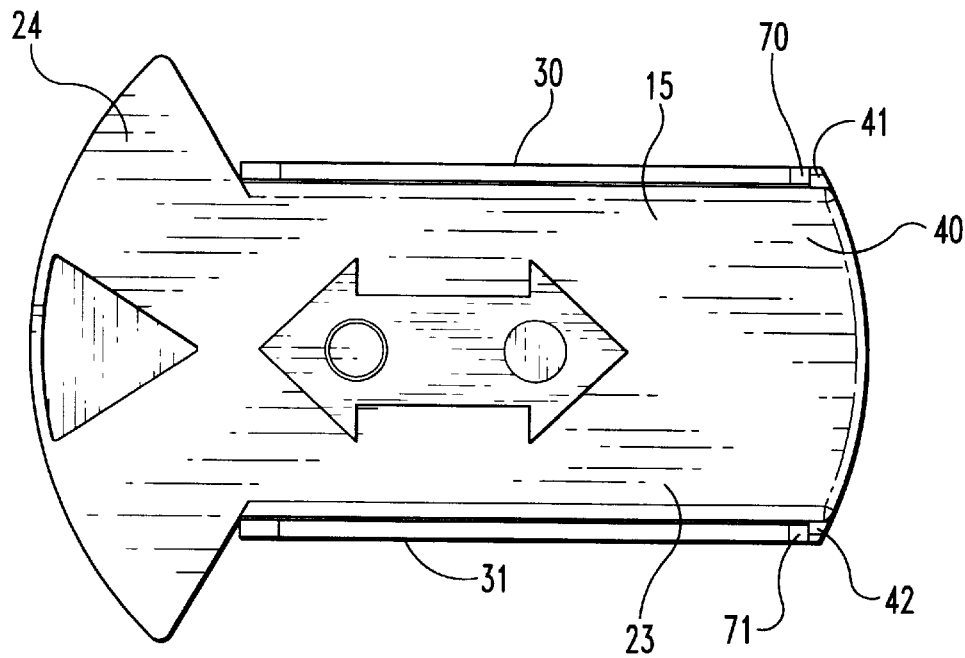
FIG. 5 is a top view of the slide dispenser shown and mounted to the lid of FIG. 1.
Figure 6:
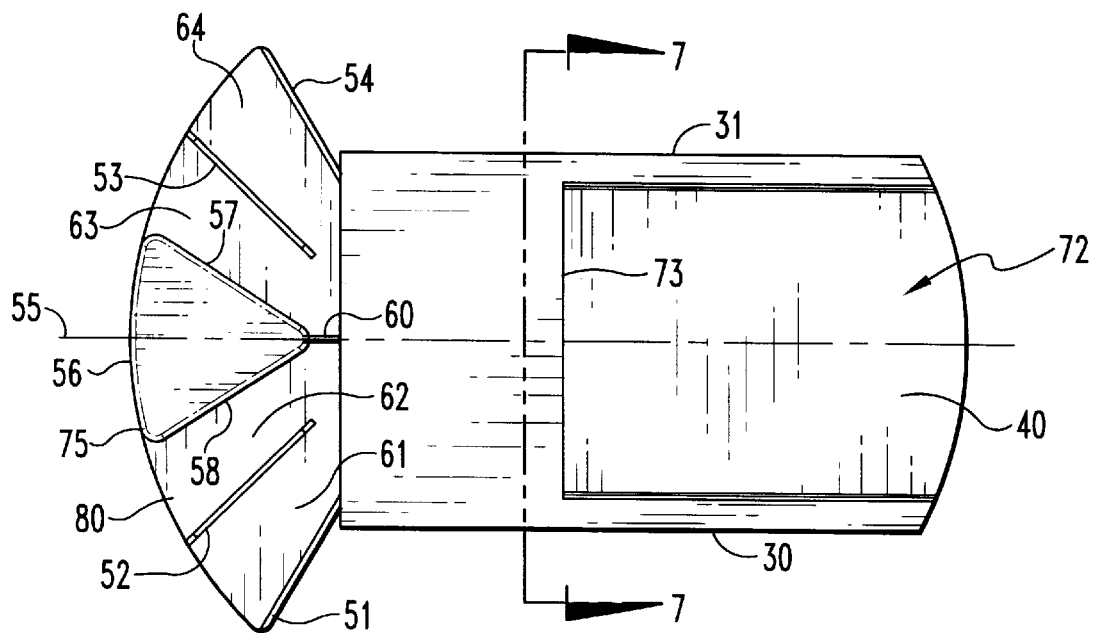
FIG. 6 is a bottom view of the slide dispenser of FIG. 5.
Figure 7:
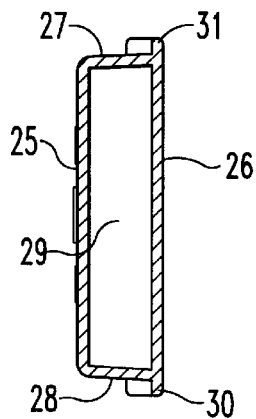
FIG. 7 is a cross-sectional view taken along the line 7—7 of FIG. 6 and viewed in the direction of the arrows.

The combination seal and dispenser 15 has an elongated tubular main body 23 (FIG. 5), also referred to herein as a "tube" for short, having a flared distal end 24. Main body or tube 23 includes a top wall 25 (FIG. 7) integrally joined to a bottom wall 26 by a pair of parallel side walls 27 and 28. Walls 25–28 define a hollow passage 29 extending lengthwise through the combination seal and dispenser. Hollow passage 29 communicates with a tube entrance, such as opening 72 (FIG. 6) formed in a proximal end of tube 23, and a tube exit, such as that defined by the flared distal end 24 of tube 23. Bottom wall 26 extends outwardly of walls 27 and 28 forming a pair of tongues 30 and 31 which are slidably received in a pair of grooves 33 and 32 (FIG. 4). Grooves 32 and 33 are formed by a pair of inwardly extending flanges 34 and 35 that extend over the bottom wall 21 of the lid main body. Grooves 32 and 33 are located between walls 18 and 19, and are contained in channel 20. Tongues 30, 31 and grooves 33, 32 form a tongue and groove combination slidably mounting the combination seal and dispenser.

The proximal end 40 of main body 23 includes a pair of vertically extending flanges 41 and 42 extending upwardly from tongues 30 and 31. Flanges 41 and 42 contact respectively ends 43 and 44 (FIG. 8) of flanges 35 and 34 limiting outward movement of main body 23 past the extended position illustrated in FIG. 2.

Channel 20 extends across the width of the lid terminating at one end with edge portion or rim 16 extending upwardly from bottom wall 21 (FIG. 8) and closing one end of the channel. Edge portion or rim 16 has an outside circular configuration and has a convex surface 46 extending across the channel providing a stop surface for the proximal end 40 (FIG. 5) of seal and dispenser 15 to contact when in the closed or sealing position of FIG. 1. The opposite end of channel 20 is defined by a pair of vertical, diverging side walls 47 and 48 extending upwardly from bottom wall 21 and forming a recess or an enlarged mouth 49 of channel 20. A pair of guide rails 50 and 51 extend longitudinally across recess 49 and upwardly from bottom wall 21. Rails 50 and 51 are located between side walls 47 and 48 and are contained within recess 49. Rails 50 and 51 contact the outwardly facing vertical surface of each tongue 30 and 31 guiding the seal and dispenser 15 as the dispenser is moved between the positions depicted in FIGS. 1 and 2.

The distal end 24 (FIG. 5) of dispenser main body 23 has a top wall 80 (FIG. 6) integrally joined to the top wall 25 (FIG. 7) of the dispenser main body 23. Four vanes 51–54 extend downwardly from wall 80 and are integrally connected therewith. The vanes slidably ride atop bottom wall 21 of channel 20. The vanes extend radially outward from the center line axis 55 extending longitudinally and centrally within passage 29. A cavity or finger depression 56 (FIG. 1) allows the user to pull and extend dispenser 15 to the position of FIG. 2 and is formed in main body 23 by three downwardly extending walls 56, 57, and 58. Walls 57 and 58 extend together in a V shape position extending downward from wall 80. Thus, four separate radially extending channels 61–64 are formed respectively by vanes 51–52, vane 52 and wall 58, wall 57 and vane 53, and vanes 53–54. A center wall 60 extends into passage 29 from the vertex of adjacent walls 58 and 57 thereby dividing the granular material flowing through passage 29 into the four separate passages 61–64.

To operate the lid and container disclosed in the drawings, the granular material is first inserted into the container and lid 10 is screwed or secured tightly thereto. The seal and dispenser 15 is then moved from the position shown in FIG. 1 to the extended position shown in FIG. 2 with the container then being inverted allowing the granular material to flow through mouth 11 and into passage 29 via hole 22. A wall 66 integrally joined to bottom wall 21 extends partially over hole 22 and in the general direction toward channels 61–64. Thus, the granular material flowing through hole 22 is deflected by wall 66 and guided through passage 29 toward channels 61–64. Notably, channels 61–64 and wall 26 are located outwardly of rim 16 of the lid thereby allowing the granular material to flow unimpeded in different radial directions.

Figure 2:
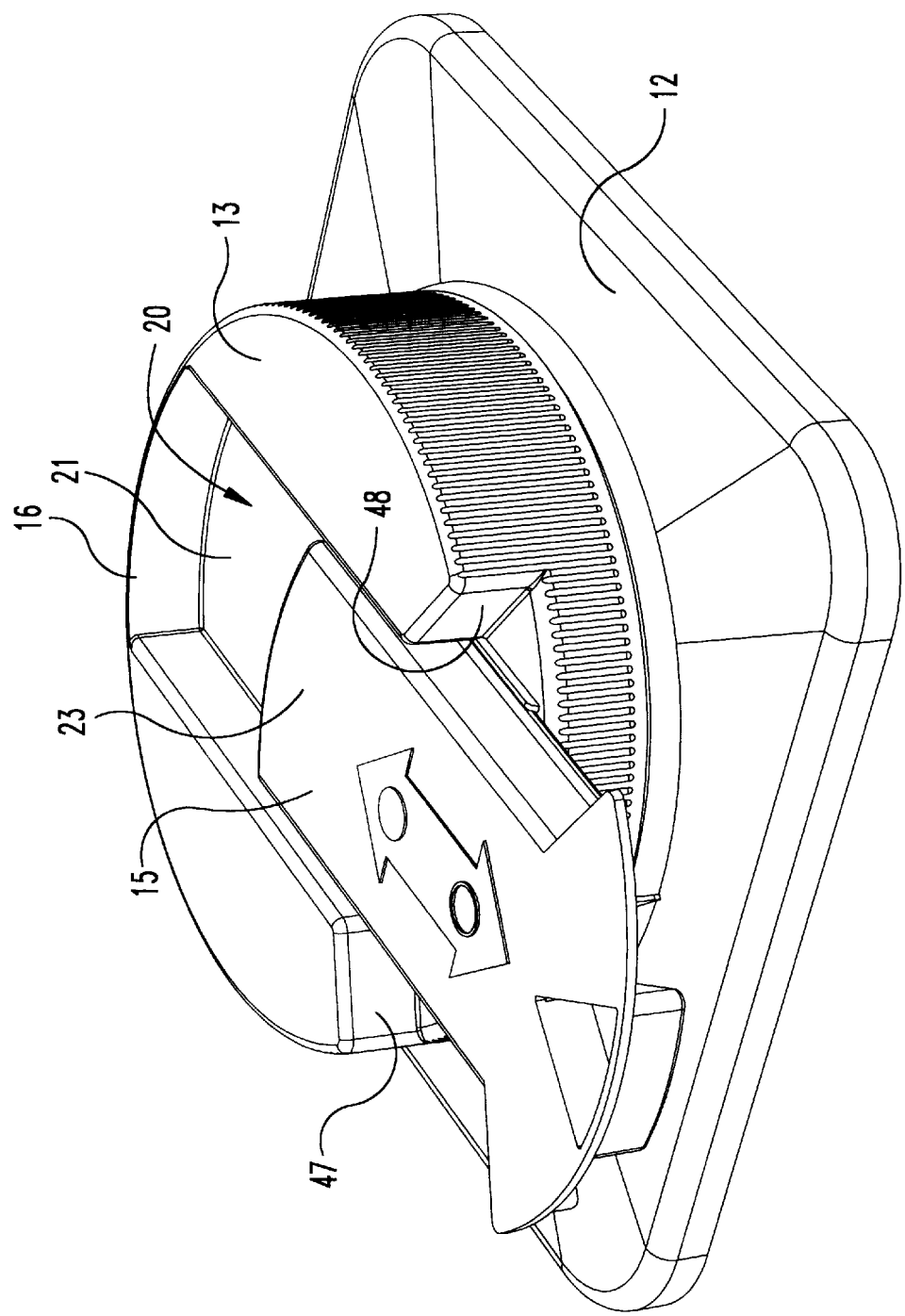
FIG. 2 is the same view as FIG. 1 only showing the lid in the opened or dispensing position.

In order to lock the seal and dispenser 15 in the extended position shown in FIG. 2, the top surface of tongues 30 and 31 (FIG. 1) are slightly upraised immediately adjacent flanges 41 and 42. The upraised portions 70 and 71 in one embodiment extended approximately 0.100 inches in the direction of the longitudinal axis 55. Further, portions 70 and 71 in the same embodiment are raised approximately 0.010 inches from the top surface of tongues 30 and 31 providing a friction surface engageable by the downwardly facing surface of flanges 35 and 34. Thus, dispenser 15 may be moved outwardly with additional force being required to move upraised portions 70 and 71 beneath flanges 35 and 34 locking the dispenser in the outward position of FIG. 2. In order to retract dispenser 15, opposite force is applied to the dispenser 15 moving the dispenser to the position depicted in FIG. 1.

When dispenser 15 is in the retracted or sealing position of FIG. 1, bottom wall 26 of dispenser main body 23 is positioned entirely over hole 22 thereby blocking flow of material through hole 22. Bottom wall 26 terminates at a location 73 (FIG. 6) located between the proximal end 40 of the dispenser and passages 61–64 thereby forming an entrance opening 72 into passage 29. Thus, when the dispenser main body 23 is moved to the extended or opened position of FIG. 2, entrance opening 72 is aligned with hole 22 allowing material flow from the container into passage 29.

Figure 8:
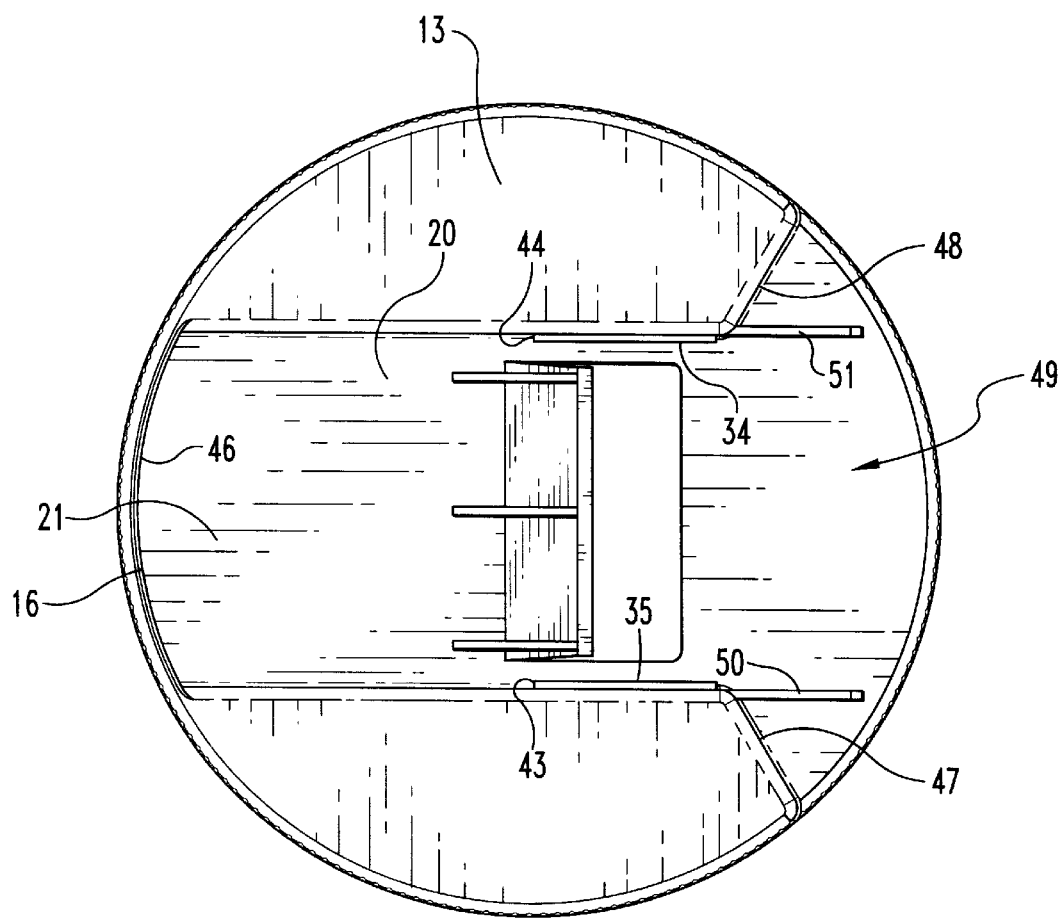
FIG. 8 is a top view of the lid without the seal and dispenser mounted thereto.

When dispenser main body 23 is in the retracted position of FIG. 1, vanes 51 and 54 (FIG. 6) are parallel with and located adjacent walls 47 and 48 (FIG. 8). Likewise, the outer edge 75 is complementary shaped relative to the rim of the lid thereby positioning dispenser main body 23 slightly inwardly of the diameter of the rim when in the retracted position of FIG. 1. Thus, passages 61–64 are located inwardly of the diameter of the lid when in the retracted position of FIG. 1.

Figure 3:
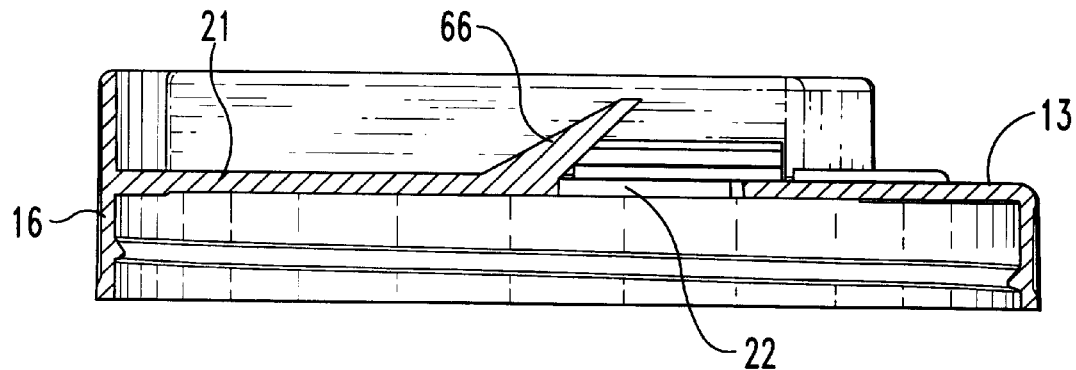
FIG. 3 is a cross-sectional view taken along the line 3—3 of FIG. 1 illustrating the lid main body without the slide dispenser mounted thereto.

The guide wall 66 (FIG. 3) extends into passage entrance 72 when dispenser main body 23 is retracted (FIG. 1) and also when extended (FIG. 2) requiring all material flow from the container to be in the direction of channels 61–64. Thus, when dispenser main body 23 is retracted, guide wall 66 prevents movement of any granular material within passage 29 toward the closed end of channel 20 thereby preventing the granular material from interfering in the tongue and groove mounting structure for the dispenser main body.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A lid to dispense material from a container having a mouth comprising:
   a main body mountable on the mouth of the container and having a circumferential edge, said main body including a material opening for receiving material moving through the mouth of the container; and
   a combination seal and dispenser movably mounted to said main body and having a sealing position whereat said seal and dispenser blocks material flow through said material opening and a dispensing position whereat material is allowed to flow through said mouth and said material opening, said seal and dispenser including a plurality of vane surfaces to direct material flowing through said opening outwardly from the lid;
   wherein said seal and dispenser includes a tube which has a proximal end with a tube entrance and a distal end with tube exit, said distal end is enlarged relative to said proximal end with said vane surfaces extending radially through said distal end to direct material flow radially outwardly;

said main body includes a pair of parallel side walls forming an upwardly opening channel and a pair of diverging walls leading from said channel forming an upwardly opening recess enlarged relative to said channel, said seal and dispenser located between said side walls and said diverging walls and is contained within said channel and said recess sealing said mouth and located within the circumferential edge when retracted, said seal and dispenser slidable to extend and project outwardly of said circumferential edge to locate said vane surfaces outwardly thereof.

2. The lid of claim 1 wherein:

said seal and dispenser have with said main body a cooperating tongue and groove combination slidably mounting said seal and dispenser to said main body and further have a pair of parallel guide rails to guide said seal and dispenser during sliding motion thereof, said combination tongue and groove locating the groove thereof within said channel between said side walls whereas said guide rails are located within said recess between said diverging walls.

3. The lid of claim 1 wherein:

said main body includes a guide wall extending upwardly from said material opening into said tube to direct material flow through said material opening into said tube entrance toward said tube exit.

4. The lid of claim 1 wherein:

said circumferential edge extends across and closes said channel at one end thereof forming a stop surface against which said proximal end of said seal and dispenser contacts when retracted, said distal end includes an outer edge conforming to said circumferential edge when retracted.

5. The lid of claim 2 wherein:

said cooperating tongue and groove combination include a stop flange limiting outward movement of said seal and dispenser relative to said main body and further have a friction portion releasably locking said seal and dispenser in position when extended.

6. The lid of claim 1 wherein:

said tube has a bottom wall sealing said material opening when said seal and dispenser is retracted, said bottom wall is spaced apart from said material opening with said tube entrance aligned with said material opening when said seal and dispenser is extended, said seal and dispenser when extended locating said bottom wall outwardly of said circumferential edge directing material flow through said tube to said tube exit located outwardly of said circumferential edge.

7. The lid of claim 1 wherein:

said distal end includes a finger cavity for pulling and extending said seal and dispenser, said finger cavity formed by a v-shaped portion extending downwardly from said distal end cooperating with said vane surfaces to direct said material radially outwardly from the lid.

8. A dispensing cover for covering a container of material and comprising:

a lid with a circumferentially extending rim, said lid mountable to a container of material and having a hole through which material from the container may flow; and a tube having a material passage extending lengthwise through said tube and having a tube entrance and a tube exit, said tube slidably mounted to said lid and having a retracted position whereat said hole is sealed by said tube limiting material flow through said passage and having an extended position whereat material may flow from said container through said hole and said tube entrance, said tube entrance being aligned with said hole and said tube exit being located in an outward position relative to said rim when said tube is in said extended position allowing material to flow from said container through said passage and then through said tube exit outwardly of said rim, said tube sealing said hole and blocking flow of material therethrough when said tube entrance is spaced apart from said hole and said tube is in said retracted position, said tube exit being located inwardly from said outward position when said tube is in said retracted position;

wherein said lid includes a guide wall which extends upwardly into said tube entrance toward said tube exit when said tube is in said retracted position and when said tube is in said extended position.

9. The cover of claim 8 wherein:

said tube exit includes a plurality of vanes which extend radially outwardly directing said material flowing through said tube exit in different directions.

10. The cover of claim 9 wherein:

said tube exit includes a center wall projecting downwardly and centrally located in said passage dividing material flow to either side of said center wall.

11. A spreader for spreading fluidized material comprising:

a container for holding a fluidized material and having a top end with a mouth thereon through which material may flow;

a lid main body removably mounted to said top end, said main body including a circumferentially located edge and a hole located inwardly thereof through which said material may flow from said mouth; and a tube slidably mounted to said lid main body having a passage including a tube entrance and a tube exit and a blocking wall extending therebetween, said tube having a retracted position whereat said blocking wall closes said mouth and blocks material flow therethrough and an extended position whereat said blocking wall is spaced apart from said mouth and said tube entrance is aligned with said hole allowing material flow from said container through said passage and outwardly therefrom through said tube exit located outwardly of said edge;

wherein said lid main body includes a pair of parallel side walls forming an upwardly opening channel and a pair of diverging walls leading from said channel forming an upwardly opening recess enlarged relative to said channel, said tube located between said side walls and said diverging walls and is contained within said channel and recess sealing said hole and located within the edge when retracted, said tube slidable to extend and project outwardly of said edge to locate said tube exit outwardly thereof.

12. The lid of claim 11 wherein:

said tube and said main body have a cooperating tongue and groove combination slidably mounting said tube to said main body and further have a pair of parallel guide rails to guide said tube during sliding motion thereof, said cooperating tongue and groove located between said side walls whereas said guide rails are located within said recess between said diverging walls.

13. The lid of claim 12 wherein:

said main body includes a guide wall extending upwardly from said hole into said tube to direct material flow through said hole into said tube entrance toward said tube exit, said edge extends across and closes said channel at one end thereof forming a stop surface against which said tube contacts when retracted.

* * * * *